Figure 1:
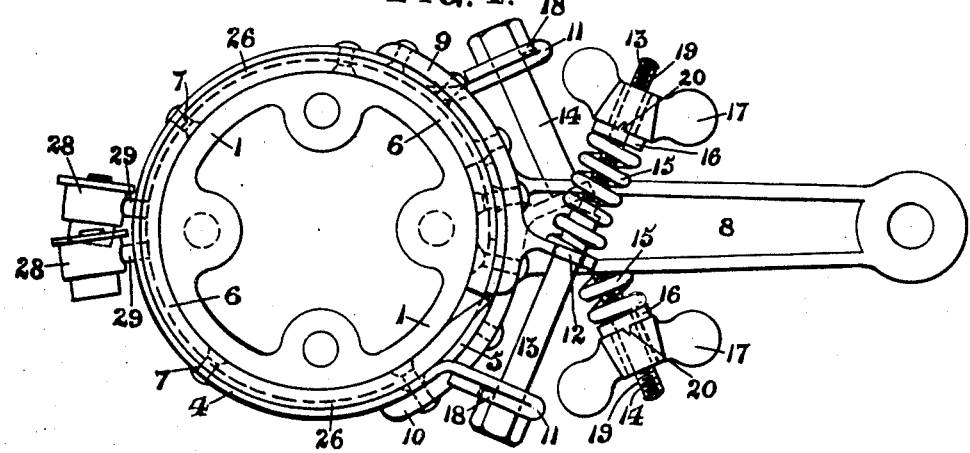

Aug. 7, 1923.  1,464,142
F. SMITH
SHOCK ABSORBER AND REBOUND DAMPER FOR MOTOR ROAD VEHICLES
Filed March 13, 1922  2 Sheets-Sheet 1

WITNESSES
Abm Reed
Charles Schiffer

INVENTOR
FRANK SMITH
BY John E. Walsh
Attorney

INVENTOR
FRANK SMITH

Patented Aug. 7, 1923.

1,464,142

UNITED STATES PATENT OFFICE.

FRANK SMITH, OF ELLAND, ENGLAND.

SHOCK ABSORBER AND REBOUND DAMPER FOR MOTOR ROAD VEHICLES.

Application filed March 13, 1922. Serial No. 543,275.

*To all whom it may concern:*

Be it known that I, FRANK SMITH, a subject of the King of Great Britain, residing at Elland, in the county of York, England, have invented Improvements in Shock Absorbers and Rebound Dampers for Motor Road Vehicles, of which the following is a specification.

This invention relates more particularly to shock-absorbers and rebound dampers operating between the chassis frame and the axles of motor road vehicles, and my object is to more efficiently control each laminated vehicle spring in both its movements, in such a manner that either movement can be varied through a large range of resistances without varying the other, and so meet the individual requirements of the spring in either direction, the reason being that in one movement, the one on the bump of the wheel, requires a different adjustment from the other which occurs on the rebound and is fairly constant, because of the differing loads, bad roads, and the speed travelled which definitely affect this movement, while the other or rebound movement is unaffected by these conditions. This method of control does not materially interfere with the normal flexibility of the springs but greatly increases the strength or capacity of the same, makes them steadier during depression yet allows them to readily absorb any shock and to immediately though steadily expand or return on the rebound to their normal positions in readiness for the next bump. My invention also obviates all oscillation of the springs beyond the normal when travelling over slightly uneven road surfaces, or when climbing under full acceleration, thereby preventing the wheels bouncing and slipping whether the vehicle is loaded or not.

According to my invention I attach a suitable brake-drum to the chassis frame in connection with each wheel. Two brake-bands with preferably specially treated leather or other suitable absorbent brake linings are mounted upon the said drum and each brake-band is offset to form a lug at one end. The offset or loose end of the near brake-band projects near the bottom side of the drum, and the corresponding end of the off brake-band projects near the top side of the said drum, whilst the other ends of the brake-bands approach within a suitable distance of their respective cranked ends and are each secured to an arm or bracket projecting on each side of an operating lever and integral with the same; the arm on the off side of the lever being secured to the end of the brake-band opposite the loose end of the near brake-band, and the arm upon the near side of the lever is secured to the brake-band opposite the loose end of the off brake-band, the arrangement being such that the raising or lowering of the lever causes one of the brake-bands to frictionally engage the drum and the other brake-band to move freely around the same. Upon each side of the lever and extending from the latter to the brackets or arms thereon aforesaid is an angular web, which, along with the cranked ends of the brake-bands have clearance holes drilled therein to receive a bolt carrying a wing-nut and washer with a spiral spring between the said washer and the web. Each bolt and spring is prevented from rotation during compression of the latter by a nut, the former by a peg or key on the bolt head fitting a corresponding recess in the lug at the end of each brake-band, and the latter, by the threaded part of the bolt having flats thereon upon which operates the aforesaid and correspondingly bored washer. The screwing up of the wing-nuts puts tension on the springs and tends to draw both ends of the brake-bands together and more or less increase their grip on the brake-drum. Each washer has a V projection on the top side which normally engages a corresponding recess in the wing-nut, and the tension of the spring acting upon the said washer prevents the nut from working loose and affecting the adjustment of the brake-band. A plate is secured to the brake-drum for keeping the brake-bands in position thereon.

The brake-linings are preferably composed of leather or other suitable material maintained in such a desirable condition that upon a displacement of the lever causing one of the brake-bands to engage the drum, such engagement whilst being effected with the necessary speed and efficiency, is gradual or smooth and not sudden and harsh in effect, therefore no shock or harshness is set up thereby. The linings are maintained in the desired condition for this purpose by a supply of oil being administrated to the back thereof by way of grooves formed therein, in which are laid wicks composed of any suitable absorbent material which receive their supplies of lubricant or the like from lubricators whose outlet pipe screws into the side of each brake-band and communicates with the said grooves. The lubricant seeps through the wicks in both linings and in gradually permeating the latter, preserves them in the desired condition for engaging the brake-drum in the manner before described.

The operating lever is connected to the axle by a rod of a suitable length with ball joints at each end, and to a suitable axle fixing bracket of any suitable or well known kind.

Figure 2:
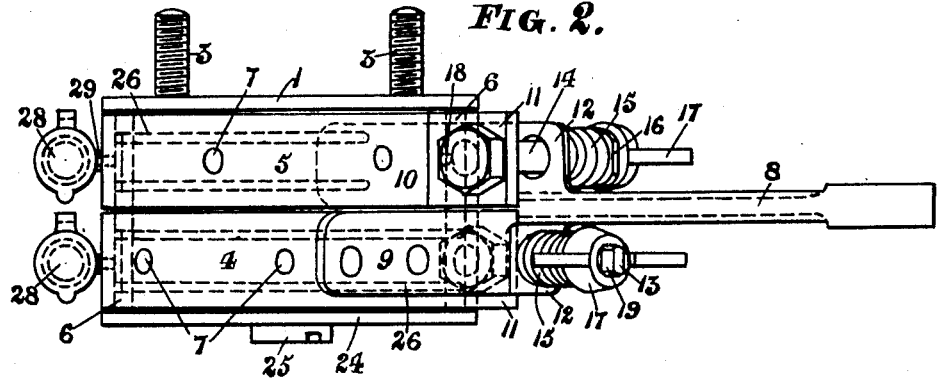
Figure 3:
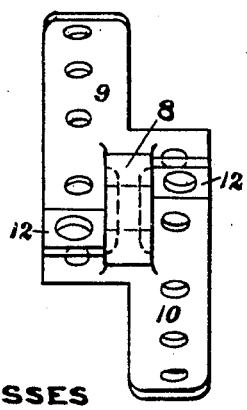
Figure 4:
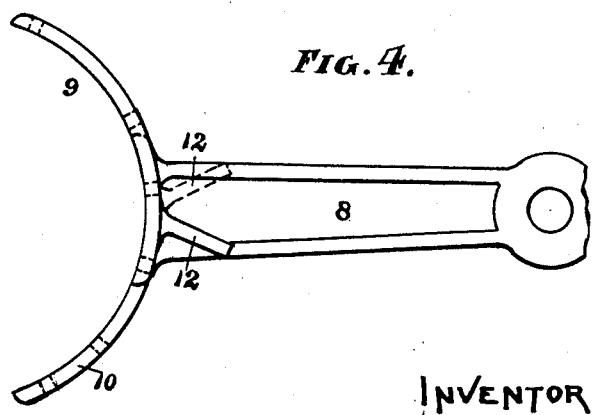
Figure 5:
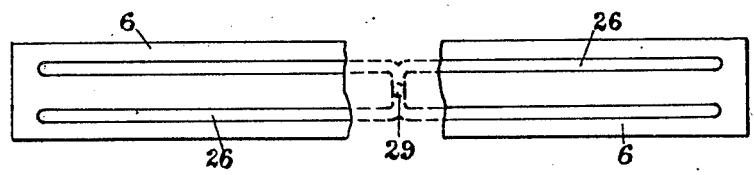
Figure 6:
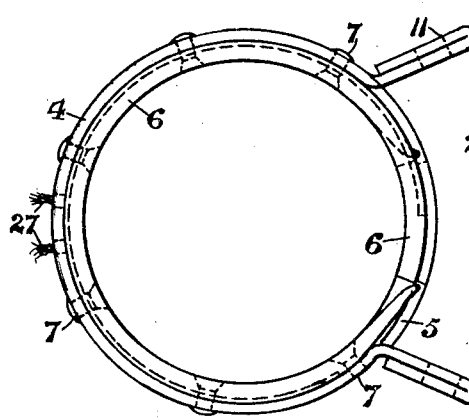
Figure 7:
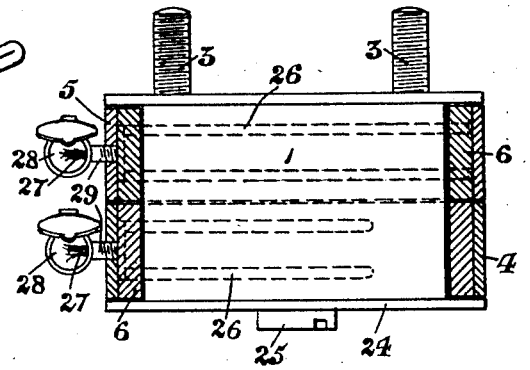
Figure 8:
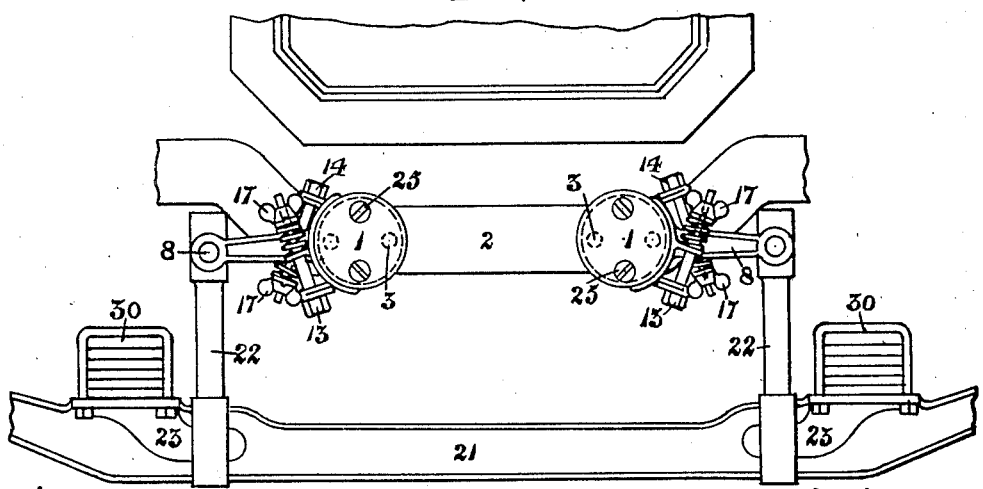

I attain these objects by the mechanism illustrated in the accompanying drawings, in which Fig. 1 is a side elevation of my improved shock-absorber and damper as applied to motor road vehicles, with side plate removed; Fig. 2 is a plan view of Fig. 1; Fig. 3 is an end view and Fig. 4 is a side view of the operating lever employed in connection with and forming a part of my invention; Fig. 5 is a plan of one of the brake linings showing the oil ducts in the back thereof; Fig. 6, is a side elevation of the brake-bands constructed according to my invention, and their relative arrangement upon the brake-drum; Fig. 7, is a plan of the brake-drum with the brake-bands and their linings shown in section thereon; and Fig. 8, is a front view of a portion of a motor road vehicle, showing my invention in connection with both wheels of the front axle.

Similar letters refer to similar parts throughout the several views:

Referring to the drawings, 1 is the brake drum secured to the chassis frame 2 by the bolts 3. 4, 5, are the near and off brake-bands respectively provided with linings 6 of leather fixed thereto by rivets 7, or by any other suitable means. 8 is the operating lever having a wing or arm 9, 10 upon each side also rivetted or otherwise attached to one end of each brake-band. The other or loose ends of the said bands are bent downward so as to form the lugs 11, and the relative positions of the arms 9, 10, upon the lever, and their attachment to the brake-bands are such, that the lug 11 of band 5 is situate on the top side of the drum, whilst the end 11 of band 4 is upon the bottom side. Also formed upon the said arms and lever near the bottom and on each side of the latter is a web 12 projecting approximately parallel with the lugs 11. The corresponding web 12 and loose end 11 of each brake-band have clearance holes drilled therein to receive bolts 13, 14, which are first passed through the ends 11, each bolt carrying a spring 15 between the web 12 and a washer 16 with which engages a thumbscrew or wing-nut 17, screwed upon the end of each bolt. A peg or key 18 in the bolt heads engages a corresponding recess in the lugs 11 to prevent the bolts from rotating. For putting tension on the springs 15 I screw up the wing-nuts, and flats 19 being formed on opposite sides of the screwed portion of the bolts with the recess in the washer 16 shaped to correspond, the latter is movable longitudinally but cannot revolve thereon. A projection 20 is also formed on each of the said washers which engages with a corresponding recess in the bottom of the wing-nuts, so that the tension of the springs 15 acting upon the washers also prevents the nut from working loose or unscrewing. The screwing up of a wing-nut tends to pull both ends of either brake-band together and more or less increase its frictional engagement with the brake-drum.

The lever 8 is connected to the axle 21, of the vehicle, by a rod 22 of a suitable length, provided with the customary ball-joints, and to a suitable axle fixing bracket 23. A plate 24 secured to the open end of the brake-drum by the screws 25, retains the brake-bands in position thereon.

In order that the brake-bands shall be gentle but effective in their gripping action and so eliminate or prevent shock or harshness by a too sudden or fierce grip on the drum, I preferably construct the brake linings 6 of leather or other suitable material of a desirable thickness and texture, and supply lubricant to the back of such linings in order to preserve them in the desired condition giving the greatest efficiency, by forming grooves 26 therein in which are placed absorbent wicks 27. In a suitable position upon each brake-band I fix an oil cup or lubricator 28 whose outlet pipe 29 screws into the said brake-bands and communicates with the aforesaid wicks which absorb, convey, and distribute the oil or the like in a manner that enables it to permeate such linings and maintain them in the condition desired for the purposes aforesaid.

In action, the relative arrangement of the brake-bands upon the drum and their attachment to the lever 8, is such as to give a wide range of resistance both ways, each way being independent of the other. The upward movement of the lever 8 causes brake-band 5 to frictionally engage the brake-drum, whilst the band 4 moves freely round the said drum and in a similar manner the downward movement of said lever causes the band 4 to frictionally engage said drum and the band 5 to move freely round the same. When thumbscrew or nut 17 is tightened and more or less tension is put upon the spring 15 on the bolt 13, the brake-band 4 offers the desired resistance to the downward or rebound movement only of the vehicle springs 30, it does not resist the upward movement thereof, consequently the adjustment may be sufficient to damp the said springs on the rebound to return them quickly though steadily to the normal position in time for the next bump, without stiffening their upward movement. Whatever tension is applied to spring 15 on the bolt 14, the brake-band 5 resists the upward movement of the lever only, and the adjustment for the bump of the wheel may be regulated to any desired degree in accordance with the weight of the vehicle, the speed usually travelled or required to be travelled, the condition of the road surface, or the load carried, which adjustment may need to be greater, or, on occasion, less than the adjustment for the rebound. By these means an independent control of the upward and downward movements of all the vehicle springs is easily obtained.

If the vehicle is lightly sprung the tension or frictional engagement of the band 5 with the drum, on compression of the spring, can be increased without increasing the frictional engagement of the band 4, and with my device the springs can be regulated on compression so as to be capable of carrying a bigger load at a much higher speed, equal to the fitting of extra leaves thereto, but with this advantage over the latter the springs retain practically the whole of their original flexibility, that is, the shock-absorbing suspension device herein described, renders the springs equally sensitive under both the minimum and the maximum loads and can be adjusted so as to be capable of increasing the effective strength of said vehicle springs on compression according to requirements without sacrificing the efficient control of the rebound movement, as before described.

What I claim as my invention and desire to secure by Letters Patent is:—

1. A shock absorber comprising a drum, a pair of brake bands encircling said drum, a lever connected to said bands provided with means whereby the drum is independently engaged by each of said bands depending upon the direction of movement of said lever.

2. A shock absorber comprising a drum, a pair of brake bands encircling said drum, a lever having laterally offset arms engaging each of said brake bands, whereby the drum is independently engaged by each of said bands depending upon the direction of movement of said lever.

3. A shock absorber attachment for vehicles comprising a drum, a pair of brake bands encircling said drum, a lever provided with oppositely extending arms one of which is secured to the upper portion of one of the bands, and the other secured to the lower portion of the other band, whereby the drum may be engaged by either of said bands depending upon the direction of movement of the lever.

4. A shock absorber attachment for vehicles comprising a drum, a pair of brake bands encircling said drum, a lever provided with oppositely extending arms one of which is secured to the upper portion of one of the bands, and the other secured to the lower portion of the other band, whereby the drum may be engaged by either of said bands depending upon the direction of movement of the lever, and means for adjusting said brake bands independently of each other.

5. A shock absorber attachment for vehicles comprising a drum, a pair of brake bands encircling said drum, a lining having grooves therein secured to the inner periphery of each of said bands, wicks in said grooves, means for applying oil to said wicks for lubricating said bands, a lever provided with oppositely extending arms one of which is secured to the upper portion of one of the bands, and the other secured to the lower portion of the other band, whereby the drum may be engaged by either of said bands depending upon the direction of movement of the lever.

6. A shock absorber attachment for vehicles comprising a drum, a pair of brake bands encircling said drum, a lining having grooves therein secured to the inner periphery of each of said bands, wicks in said grooves, means for applying oil to said wicks for lubricating said bands, a lever provided with oppositely extending arms one of which is secured to the upper portion of one of the bands, and the other secured to the lower portion of the other band, whereby the drum may be engaged by either of said bands depending upon the direction of movement of the lever, and means for adjusting said brake bands independently of each other.

7. A shock absorber attachment for vehicles comprising a drum, a pair of laterally spaced brake bands encircling said drum, a lever having oppositely extending arms each secured to its adjacent band, a web on each of said arms having an opening therein, an outwardly projecting lug on each of the free ends of said bands and having openings aligning with the openings in the webs, means connected to each of said bands and said webs for adjusting said bands independently of each other, and means normally tending to draw the ends of said bands together.

8. A shock absorber attachment for vehicles comprising a drum, a pair of laterally spaced brake bands encircling said drum, a lever having oppositely extending arms each secured to its adjacent band, a web on each of said arms having an opening therein, an outwardly projecting lug on each of the free ends of said bands and having openings aligning with the openings in the webs, bolts extending through said openings, a spring on each of said bolts, and a nut engaging said bolts whereby the resistance to the upward movement of the lever may be varied independently of the resistance to the downward movement.

9. A shock absorber attachment for vehicles comprising a drum, a pair of laterally spaced brake bands encircling said drum, linings secured to the inner periphery of said bands, means for lubricating said lining on each of said bands, a lever having oppositely extending arms each secured to its adjacent band, a web on each of said arms having an opening therein, an outwardly projecting lug on each of the free ends of said bands and having openings aligning with the openings in the webs, means connected to each of said bands and said webs for adjusting said bands independently of each other, and means normally tending to draw the ends of said bands together.

10. A shock absorber comprising a drum, a brake band encircling said drum, a lining having grooves therein secured to the inner periphery of said band, wicks in said grooves, means for supplying lubrication to said wicks, a lever having an arm secured to one end of said band, an offset lug on the other end of said band, and means connected to said arm and lug for adjusting the band relative to said drum.

11. The combination with a vehicle spring of means operatively associated with said spring for independently retarding the compression and expansion of the spring, comprising a drum, a pair of brake bands encircling said drum, a lever connected at one end to said spring, and at its opposite extremity provided with oppositely extending arms laterally spaced relative to each other, each of said arms being attached to one of the said brake bands, means tending to draw the bands together, and means for alternately engaging said bands with said drum depending upon the direction of movement of the lever.

In testimony whereof I hereunto affix my signature.

FRANK SMITH.